E. M. BARNES.
STEERING MECHANISM FOR MOTOR VEHICLES.
APPLICATION FILED OCT. 19, 1914.
1,262,619. Patented Apr. 16, 1918.
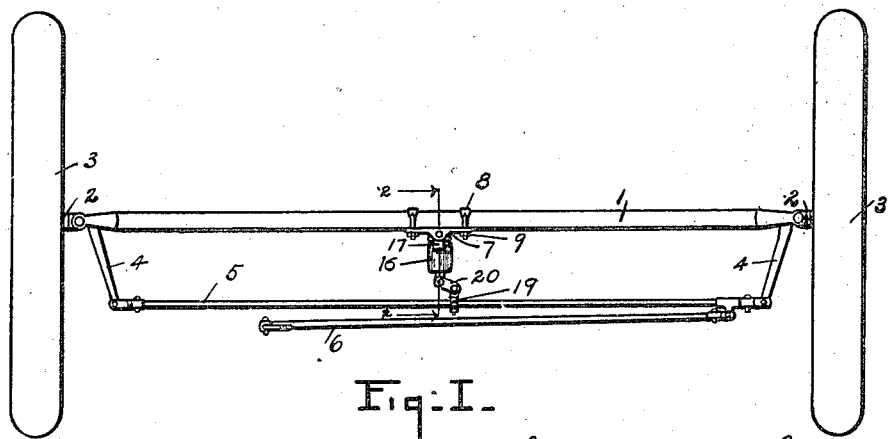
Fig. I.
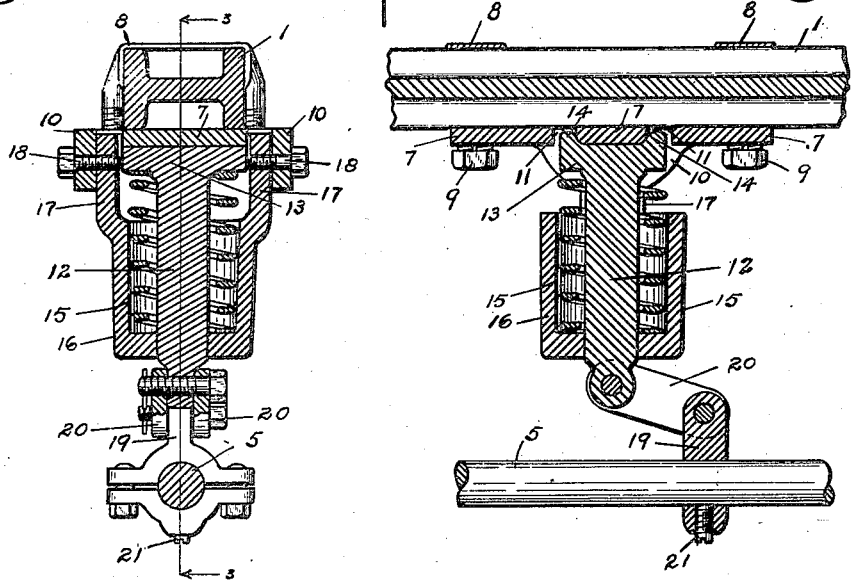
Fig. II. Fig. III.
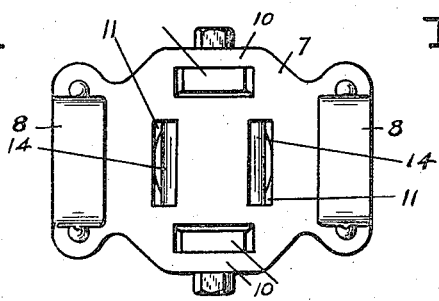
Fig. IV.
Witnesses
P. N. Pomeroy
Lenn Gilman
Inventor
Edward M. Barnes
By Chappell & Earl
Attorneys

UNITED STATES PATENT OFFICE.

EDWARD M. BARNES, OF HASTINGS, MICHIGAN, ASSIGNOR, BY MESNE ASSIGNMENTS, TO ABEN E. JOHNSON, OF HASTINGS, MICHIGAN.

STEERING MECHANISM FOR MOTOR-VEHICLES.

1,262,619.  Specification of Letters Patent.  Patented Apr. 16, 1918.

Application filed October 19, 1914. Serial No. 867,496.

*To all whom it may concern:*

Be it known that I, EDWARD M. BARNES, a citizen of the United States, residing at Hastings, Michigan, have invented certain new and useful Improvements in Steering Mechanisms for Motor-Vehicles, of which the following is a specification.

This invention relates to improvements in steering mechanisms for motor vehicles.

In motor cars, particularly those having steering mechanisms other than the worm types, constant attention is required on the part of the driver to keep the car in the straightaway path, that is, as soon as the steering wheel is released there is a tendency for the vehicle wheels to swing one way or another and shocks and strains occasioned by the striking of obstacles by the vehicle wheels are communicated to the steering wheel.

The main objects of my invention are:

First, to provide an improved attachment, for certain types of motor vehicle steering gears now in use, which yieldingly holds the steering wheels of the vehicle in a straightaway course and tends to return them to a straightaway position when diverted therefrom.

Second, to provide an improved attachment for steering gears having these advantages, which is quickly applied and does not disfigure or materially change the appearance of the vehicle.

Third, to provide an improved steering gear mechanism which tends to hold the steering wheels in a straightaway course and to return them to such course when diverted therefrom, and which is simple and durable in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail plan view of a structure embodying the features of my invention, only such parts of a motor vehicle being illustrated as are required to illustrate the application of my invention in a practical embodiment.

Fig. II is an enlarged sectional view on a line corresponding to line 2—2 of Fig. I.

Fig. III is an enlarged sectional view on a line corresponding to line 3—3 of Fig. II.

Fig. IV is a rear view of the device removed from the axle.

In the drawing similar reference characters refer to similar parts throughout the several views and the sectional views are taken looking in the direction of the little arrows at the ends of the section lines.

Referring to the drawing, 1 represents the front axle, 2 the steering spindles and 3 the steering wheels of a motor vehicle. The spindles 2 are provided with the usual arms 4 connected by the spindle connecting rod 5. The connecting rod 5 is connected to the steering gear proper by the link 6.

On the axle 1 I mount a bracket 7 by means of the clips 8, the clips embracing the axle and being drawn up by means of the nuts 9. The bracket is provided with a pair of pivot ears 10. Between these ears the bracket has transverse slots 11. A rocking member or post 12 is mounted on the bracket to rock thereon, the post being provided with a base 13 having flange-like lugs 14 engaging the slots 11. This prevents lateral slipping of the post on the bracket as the post is rocked.

A coiled spring 15 is arranged on the post to rest on its base. A cup-like spring holder 16 is sleeved upon the post and provided with ears 17 mounted upon the ears 10 of the bracket by the pivots 18. The spring is normally under stress and normally holds the post or rocking member in its central position, as shown in the drawings. When the post is rocked on its base, the spring is compressed still further. The post is connected to the connecting rod 5 by means of the clip 19 and the link 20. The clip is adjustably secured to the rod by means of the set screw 21.

In applying or attaching the device the bracket 7 is secured to the axle in a central position on the side of the connecting rod 5. The clip 19 is then arranged on the steering spinde connecting rod and adjusted thereon to such position as permits the post 12 to stand in its central position, and the clip secured to the rod in such position.

The swinging of the steering connecting rod in either direction rocks the post 12 against the tension of its spring and the spring returns or tends to return the post to central position and thus brings the steering wheels to their straightaway position and holds them normally in their straightaway position.

In the event of striking an obstacle the shock is mainly sustained by the spring so that the driver is relieved therefrom and the steering wheel is also relieved of a large amount of the vibration commonly present, particularly in steering gears other than the worm types.

I have illustrated and described my improvements in the form in which I have embodied the same for use on Ford motor cars, but the same may be readily adapted for other types or makes of cars. I have not attempted to illustrate or describe the various modifications which might be desirable to adapt the same to other makes of cars as they are mainly a matter of proportion of the parts and it is believed that the structure illustrated will enable those skilled in the art to which my invention relates to embody or adapt the same as conditions may require.

Having thus described my invention, what I claim as new and desire to secure by Letters Patent, is:

1. In a steering device for automobiles, an axle, two spindles pivoted thereto and provided each with a crank, a rod connecting said cranks and adapted to be moved longitudinally by manually operated steering mechanism, a lever support secured to the axle, a lever connected to and movable with said rod and having two fulcra on said lever support, the lever being supported upon both fulcra when the lever and rod are in the straight ahead position and adapted when oscillated to rest alternately upon one and then the other of said fulcra, and yielding means for normally forcing the lever to the straight ahead position.

2. In a steering device for automobiles, an axle, two spindles pivoted thereto and provided each with a crank, a rod connecting said cranks and adapted to be moved longitudinally by manually operated steering mechanism, a lever support secured to said axle, a lever connected to and movable with said rod and having two fulcra on said lever support, the lever being supported upon both fulcra when the lever and rod are in the straight ahead position, and when oscillated resting alternately upon one and then the other of said fulcra, and spring means for normally forcing the lever to the straight ahead position.

3. In a steering device for automobiles, a lever support having means for attachment to an automobile axle, a lever having means for attachment to a steering rod of an automobile and having two fulcra on said support, the lever being supported on both fulcra when the lever is in the straight ahead position and adapted to rest, when oscillated, upon said fulcra alternately, and yielding means for normally resisting movement of the lever in either direction.

4. In a steering device for automobiles, a lever support having two seats and provided with means for attachment to an automobile axle, a lever having two arms which respectively rest in said seats when the lever is in the straight-ahead position and adapted when oscillated from said position to swing alternately on said seats, means for attaching said lever to the steering rod of the automobile, and yielding means for normally forcing said lever to the straight-ahead position.

5. In a steering device for automobiles, a lever support attached to an automobile chassis and horizontally spaced from the automobile steering knuckle connecting rod, a lever connected to the steering knuckle connecting rod and movable therewith, and having two fulcra on said lever support, the lever being supported on both fulcra when the lever and rod are in straight ahead position and when oscillated from side to side pivoting alternately upon said fulcra, and spring means resisting movement of the lever in either direction.

6. In a structure of the class described, the combination with the axle, of a steering means including a steering spindle connecting rod, a bracket provided with pivot ears and having spaced transverse slots between the ears mounted on said axle on the side of said connecting rod, a post having a base mounted on said bracket to rock thereon and provided with lugs engaging said slots in said base, a coiled spring disposed on said post to seat on its said base, a cap-like spring holder sleeved upon said post and provided with ears pivoted on said bracket ears, a clip adjustably mounted on said connecting rod, and a link connecting said clip to said post.

7. In a structure of the class described, the combination with the axle, of a steering means including a steering spindle connecting rod, a bracket having spaced transverse slots mounted on said axle on the side of said connecting rod, a post having a base mounted on said bracket to rock thereon and provided with lugs engaging said slots in said base, a coiled spring disposed on said post to seat on its said base, a spring holder sleeved upon said post and pivotally mounted on said bracket, a clip adjustably mounted on said connecting rod, and a link connecting said clip to said post.

8. In a structure of the class described, the combination with the axle, of a steering means including a steering spindle connecting rod, a bracket provided with pivot ears and having spaced transverse slots between the ears mounted on said axle on the side of said connecting rod, a post having a base mounted on said bracket to rock thereon and provided with lugs engaging said slots in said base, a coiled spring disposed on said post to seat on its said base, a cap-like spring holder sleeved upon said post and provided with ears pivoted on said bracket ears, and connections between said post and said connecting rod.

9. In a structure of the class described, the combination with the axle, of a steering means including a steering spindle connecting rod, a bracket having spaced transverse slots mounted on said axle on the side of said connecting rod, a post having a base mounted on said bracket to rock thereon and provided with lugs engaging said slots in said base, a coiled spring disposed on said post to seat on its said base, and a spring holder sleeved upon said post and pivotally mounted on said bracket.

10. In a structure of the class described, the combination with the axle, of a steering means including a steering spindle connecting rod, a bracket mounted on said axle on the side of said connecting rod, a post having a base mounted on said bracket to rock thereon, a coiled spring disposed on said post to seat on its said base, a spring holder sleeved upon said post and pivoted on said bracket, and a link connecting said post to said connecting rod.

11. In a structure of the class described, the combination with the axle, of a steering means including a steering spindle connecting rod, a bracket mounted on said axle, a member mounted on said bracket for rocking movement, a spring mounted on said rocking member to act thereon, a spring holder slidably engaging said rocking member and pivotally mounted on said bracket whereby the spring tends to normally return said rocking member to a central position, and a link connecting said rocking member to said connecting rod.

In witness whereof, I have hereunto set my hand and seal in the presence of two witnesses.

EDWARD M. BARNES. [L. S.]

Witnesses:
 HARRY G. HAYES,
 F. C. SHERMAN.

Copies of this patent may be obtained for five cents each, by addressing the "Commissioner of Patents, Washington, D. C."